United States Patent [19]

Mucci

[11] Patent Number: 5,107,626
[45] Date of Patent: Apr. 28, 1992

[54] METHOD OF PROVIDING A PATTERNED SURFACE ON A SUBSTRATE

[75] Inventor: Michael V. Mucci, Hudson, Wis.

[73] Assignee: Minnesota Mining and Manufacturing Company, St. Paul, Minn.

[21] Appl. No.: 651,657

[22] Filed: Feb. 6, 1991

[51] Int. Cl.$^5$ .......................... B24B 7/19; B24B 3/00; B24D 7/20

[52] U.S. Cl. .................. 51/281 R; 51/293; 51/295; 51/298

[58] Field of Search ............. 51/293, 295, 298, 281 R

[56] References Cited

U.S. PATENT DOCUMENTS

| | | | |
|---|---|---|---|
| 2,001,911 | 5/1935 | Wooddell et al. | 51/190 |
| 2,108,645 | 2/1938 | Bryant | 91/68 |
| 2,252,683 | 8/1941 | Albertson | 51/293 |
| 2,292,261 | 8/1942 | Albertson | 51/195 |
| 2,682,733 | 7/1954 | Buckner | 51/283 |
| 2,755,607 | 7/1956 | Haywood | 51/183 |
| 2,820,746 | 1/1958 | Keeleric | 204/16 |
| 2,907,146 | 10/1959 | Dyar | 51/195 |
| 3,048,482 | 8/1962 | Hurst | 51/298 |
| 3,181,279 | 5/1965 | Bauer et al. | 51/90 |
| 3,246,430 | 4/1966 | Hurst | 51/402 |
| 3,621,615 | 11/1971 | Ottinger | 51/5 |
| 3,684,348 | 8/1972 | Rowland | 350/103 |
| 3,689,346 | 9/1972 | Rowland | 156/245 |
| 3,794,474 | 2/1974 | Megens | 51/295 |
| 4,037,367 | 7/1977 | Kruse | 51/209 |
| 4,318,766 | 3/1982 | Smith | 156/330 |
| 4,420,527 | 12/1983 | Conley | 428/172 |
| 4,539,017 | 9/1985 | Augustin | 51/293 |
| 4,576,850 | 3/1986 | Martens | 428/156 |
| 4,652,274 | 3/1987 | Boettcher et al. | 51/298 |
| 4,735,632 | 4/1988 | Oxman et al. | 51/295 |
| 4,751,138 | 6/1988 | Tumey et al. | 428/323 |
| 4,773,920 | 9/1988 | Chasman et al. | 51/295 |
| 4,903,440 | 2/1990 | Larson et al. | 51/298 |
| 4,930,266 | 6/1990 | Calhoun et al. | 51/293 |
| 5,011,513 | 4/1991 | Zador et al. | 51/295 |
| 5,014,468 | 5/1991 | Ravipati et al. | 51/295 |

FOREIGN PATENT DOCUMENTS 0354022 2/1990 European Pat. Off.
0396150 11/1990 European Pat. Off.

OTHER PUBLICATIONS

Two letters relating to pre-filing confidential disclosures relating to fine grade coated abrasive products.
Lewis and Schleicher, *The Grinding Wheel*, Third Edition, Grinding Wheel Institute (1976), Chapter 14, pp. 165-176.

*Primary Examiner*—William R. Dixon, Jr.
*Assistant Examiner*—Deborah Jones
*Attorney, Agent, or Firm*—Gary L. Griswold; Walter N. Kirn; David L. Weinstein

[57] ABSTRACT

A method of treating a workpiece by an abrasive article, the surface of which has a specified pattern. The abrasive article comprises a backing having at least one abrasive composite bonded thereto. The abrasive composite or composites comprise a plurality of abrasive grains dispersed in a binder. The abrasive composite or composites have a predetermined shape and are disposed in a predetermined array, which typically consists of a plurality of peaks and valleys. As a result of the method of this invention, the surface of the workpiece can be provided with a profile that is similar to or substantially identical to the inverse of the pattern of the abrasive article.

5 Claims, 7 Drawing Sheets

METHOD OF PROVIDING A PATTERNED SURFACE ON A SUBSTRATE

1. FIELD OF THE INVENTION

This invention relates to a method of providing a predetermined pattern to the surface of a workpiece, and, more particularly, a method for providing such a pattern by means of abrading.

2. BACKGROUND OF THE INVENTION

Many articles, e.g., boats, airplanes, skis, air foils, mixing blades, have fluids flow over their surface. Such fluids include air, other gases, liquids, and semi-solids. The roughness of the surface of the article is critical, because it directly affects how efficiently the fluid flows over the article. The more efficiently a fluid flows, the less energy is required to transport it.

European Patent Application 354,022, published Feb. 7, 1990, discloses a method to increase the efficiency of fluid flow over a surface by attaching a flexible and/or stretchable substrate to the surface to reduce the drag resistance or increase the efficiency of a fluid flowing thereover. This substrate has small individual sections each of which has a patterned surface.

Another method of treating the surface of an article involves bringing an abrasive product into frictional contact with the surface such that a portion of the surface is abraded away. Abrasive products suitable for this purpose include coated abrasives, lapping abrasives, bonded abrasives, and non-woven abrasives. Such a manner of abrading, known as form grinding, is a standard procedure in the abrasives industry (see U.S. Pat. No. 3,794,474 and Kenneth B. Lewis and William F. Schleicher, *The Grinding Wheel*, Third Edition, Grinding Wheel Institute (1976), Chapter 14, pp. 165–176). In form grinding, a bonded abrasive wheel in which a form or shape is imparted to the outer periphery of the wheel is brought into contact with a workpiece, and the inverse of the shape of the bonded wheel is imparted to the surface of the workpiece.

U.S. Pat. No. 2,682,733 discloses an abrasive product comprising a fibrous backing having an abrasive coating thereon. The abrasive coating contains abrasive particles embedded in a binder. When the binder is uncured, the abrasive coating is subjected to a pressure die containing a plurality of ridges, which forms rectangular grooves running in two different directions. U.S. Pat. No. 4,773,920 discloses an abrasive product, i.e., a lapping film, having an abrasive composite formed of abrasive grains distributed throughout a radiation curable binder. The patent also discloses that a pattern can be imparted to the abrasive product by means of a rotogravure roll.

The foregoing references, however, do not teach an efficient method for treating the surface of a workpiece such that the surface will be provided with the type of profile that promotes efficient flow of fluids over it.

SUMMARY OF THE INVENTION

This invention provides a method of treating a workpiece by an abrasive article, the surface of which has a specified pattern. As a result of the method of this invention, the surface of the workpiece can be provided with a profile that is substantially identical to the inverse of the pattern of the abrasive article.

The abrasive article comprises a backing having at least one abrasive composite, and preferably a plurality of abrasive composites, bonded thereto. Each abrasive composite comprises a plurality of abrasive grains dispersed in a binder. Each abrasive composite has a predetermined shape and is disposed in a predetermined array, which typically consists of a plurality of peaks and valleys. When the abrasive article and the surface of the workpiece are brought into contact and the article is rubbed against the workpiece in an appropriate direction, the abrasive article abrades a portion of the surface of the workpiece away such that the surface has imparted thereto a recognizable profile or pattern that is similar to or substantially identical to the inverse of the pattern characteristic of the abrasive article. This pattern allows the workpiece to exhibit more efficient flow of fluid along the surface thereof.

DETAILED DESCRIPTION

Abrasive articles suitable for this invention are described in Assignee's copending application Ser. No. 07/651,660 filed on even date herewith, and incorporated herein by reference. That application discloses a coated abrasive article comprising a backing 12 bearing on at least one major surface thereof abrasive composites 14 comprising a plurality of abrasive grains 16 dispersed in a binder 18. The binder serves as a medium for dispersing abrasive grains, and it may also bond the abrasive composites to the backing. The abrasive article has a pattern comprising at least one predetermined shape arranged in a predetermined array. The abrasive composites have a predetermined shape, e.g., pyramids, grooves. Each composite has a boundary, which is defined by one or more planar surfaces. For example, in FIG. 1 the planar boundary is designated by reference numeral 15. Before use, it is preferred that the individual abrasive grains not project beyond the plane of the predetermined shape Furthermore, the composites are disposed in a predetermined array. For example, the specified array can have a plurality of peaks and valleys. The abrasive article and the method of making the abrasive article are further described in Assignee's aforementioned copending application, U.S. Ser. No., 07/651,660.

It is preferred that the abrasive article comprise a backing of polyester film primed with ethylene acrylic acid. The binder is preferably radiation curable and the abrasive grain is preferably fused alumina. The weight ratio of the binder to the abrasive grain preferably ranges from one to one to one to four.

The workpiece can be any solid material. Representative materials of workpieces include, but are not limited to, metal and metal alloys, such as carbon steel, stainless steel, high nickel alloys, and titanium, plastic, painted surfaces, ceramics, wood, wood-like materials, inorganic materials, such as marble and stone, etc. The surface that is to be abraded can be relatively flat or contoured.

In the method of this invention, the abrasive article is first brought into contact with the surface of the workpiece. Then the abrasive article is moved along the surface of the workpiece in a direction calculated to impart to the workpiece a pattern or profile that is substantially identical or similar to the inverse of the pattern of the abrasive article. Sufficient pressure must be applied so that the abrasive article will abrade or remove a sufficient amount of the surface of the workpiece so that the surface will have been noticeably altered. The amount of pressure at the abrading interface must be properly controlled. If a great amount of pressure is applied, more of the workpiece will be abraded faster, and the abrasive article will tend to wear faster. Likewise, if a small amount of pressure is applied, then the workpiece will be abraded slower, and the abrasive article will tend to wear slower. The particular amount of pressure employed will depend on the particular abrading application and the nature of the workpiece.

If the abrasive article is in the form of an endless abrasive belt, then the tracking of this belt on the abrading machine should be controlled by maintaining the belt in a nearly constant position, i.e., side-to-side displacement should be minimized, so that the position of the abrasive article relative to the workpiece is nearly the same throughout the abrading operation, thereby providing the workpiece a surface profile that is similar to or substantially identical to the inverse of the pattern of the abrasive belt.

The abrasive article is preferably supported by an external support during the abrading operation. If the abrasive article is in the form of a sheet or a disc, it will typically be supported by a back up pad. If the abrasive article is in the form of an endless belt, it will typically be supported either by a contact wheel or a platen. If the abrasive article is in the form of a disc, which is designed to be rotated, the pattern on the article will typically be circular or radial in nature.

Prior to being abraded according to the method of this invention, the surface of the workpiece will have a flat, contoured, or random profile. If a surface has a random profile, the graph of the surface profile generated by a profilometer is random, i.e., not periodic. At the completion of the abrading process of this invention, the surface of the workpiece will exhibit a recognizable pattern or profile. This pattern can be characterized by the graph of a profilometer probe that has traversed the surface of the workpiece.

The surface pattern of the workpiece, as characterized by a profilometer, can be made to have a greater Ra value after the abrading process than before the abrading process. The Ra value is an arithmetic value of the surface finish of a workpiece and is usually measured in microinches. In contrast, the abrading processes of the prior art are intended to reduce the Ra value of the surface of the workpiece, not to increase the Ra value.

The recognizable pattern on the surface of the workpiece can be made substantially identical to the inverse of the pattern of the abrasive article. In the method of this invention, the peaks from the pattern of the abrasive article produce the valleys of the surface of the workpiece. Likewise, if the abrading process was continued for a sufficient period of time, the valleys of the pattern of the abrasive article would produce the peaks of the surface of the workpiece. That the surface of the workpiece may not be identical to the inverse of the pattern of the abrasive article can be attributed to several factors. First, the lower peaks of the pattern of the abrasive article may not achieve full penetration into the workpiece. Second, there may be some vibration associated with the abrading apparatus, which would cause the pattern of the abrasive article to shift relative to the surface of the workpiece. However, the surface of the workpiece and the pattern of the abrasive article can be made to be substantially identical in nature.

Some specific patterns have a directionality to them. For example, specific patterns may have linear grooves in one direction, in two directions, or in more than two directions. If the pattern has a directionality, then during abrading, the abrasive article should be brought into contact with the workpiece in a specific directional manner. For example, if the specific pattern of the abrasive article has linear grooves, then the abrasive article should be rubbed against the workpiece in a linear manner parallel to the grooves. This will cause the surface of the workpiece to develop a pattern that is substantially identical in nature to the inverse of the specific pattern of the abrasive article. If this same abrasive article were rubbed against the workpiece in a random manner or in a direction not parallel to the directionality of the pattern, then the surface of the workpiece would exhibit a random pattern.

This invention is an advancement in the art, because the surface of the workpiece will have been provided with a pattern, without any additional layers of other materials attached to the surface of the workpiece to create the desired profile. These additional layers would add extra weight to the workpiece; in the case of aircraft, this additional weight would be undesirable.

Additionally, many workpieces are abraded to remove defects on the surfaces thereof. This invention allows a pattern to be formed on the surface of the workpiece at the same that the surface defects are being removed.

The surface of the workpiece will generally consist of peaks and valleys depending upon the particular pattern desired, which is believed to result in efficient flow of fluids over the surface of the workpiece. Additionally, the pattern of the abrasive article provides a very precise pattern on the surface of the workpiece, thereby resulting in a recognizable pattern differing from the random pattern provided by abrading methods of the prior art.

The following non-limiting examples will further illustrate the invention. All ratios are based upon weight.

EXAMPLES 1 AND 2 AND COMPARATIVE EXAMPLES A, B, AND C

EXAMPLE 1

Figure 1:
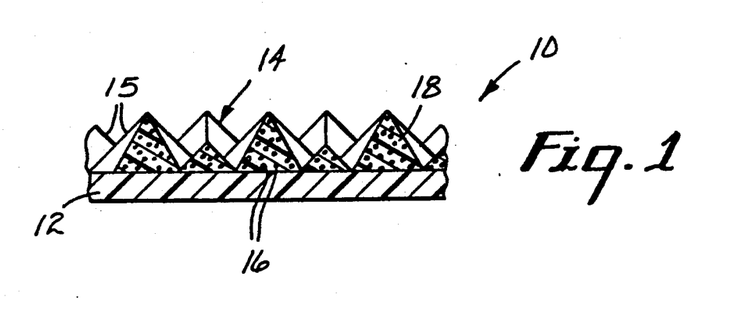
FIG. 1 is a side view in cross section of an abrasive article useful in the method of the present invention.

The abrasive article for Example 1 was made according to the following procedure. A slurry containing a binder (1 part by weight) and fused alumina (2 parts by weight) having an average particle size of 40 micrometers was prepared. The binder consisted of 100 parts by weight of triacrylate of tris(hydroxy ethyl) isocyanurate, 10 parts by weight of isoborynylacrylate, and 2 parts by weight of 2,2-dimethoxy-1,2-diphenyl-1-ethanone. The abrasive slurry was introduced onto a production tool having a shaped pattern as illustrated in FIG. 1. Then a 0.076 millimeter polyester film backing having an ethylene acrylic acid prime coating was introduced to the production tool. The slurry was then allowed to wet the surface of the primed polyester film. Next, polymerization of the binder was initiated by exposure to ultraviolet light through the polyester film. The resulting abrasive article was then removed from the production tool. Because the binder was polymerized or solidified in the production tool, the binder could not flow, and, consequently, the abrasive article had a very precise pattern.

EXAMPLE 2

The abrasive article for Example 2 was made and tested in the same manner as was that of Example 1, except that the binder contained 100 parts by weight of an aminoplast resin having pendant acrylate functional groups, 10 parts by weight of isobornylacrylate, and 2 parts by weight 2,2-dimethoxy-1,2-diphenyl-1-ethanone. This aminoplast resin was made in a manner similar to that described in U.S. Pat. No. 4,903,440, Preparation 4.

COMPARATIVE EXAMPLE A

The abrasive article for Comparative Example A was a 40 micrometer IMPERIAL MICROFINISHING film abrasive article, commercially available from Minnesota Mining and Manufacturing Company, St. Paul, Minn.

COMPARATIVE EXAMPLE B

The abrasive article for Comparative Example B was a grade P320 THREE-M-ITE RESIN BOND cloth abrasive article, commercially available from Minnesota Mining and Manufacturing Company, St. Paul, Minn.

COMPARATIVE EXAMPLE C

The abrasive article for this example made according to the assignee's co-pending application, U.S. Ser. No. 07/651660, Comparative Example C. This abrasive article was made according to the teachings of U.S. Pat. No. 4,773,920.

The comparative examples are examples of conventional abrasive articles.

PROCEDURE FOR TESTING ABRASIVE ARTICLES

Each abrasive article was converted into a 7.6 cm by 335 cm endless belt. Before abrading, a profilometer traversed the surfaces of the workpieces and the unused abrasive belt. The profilometer was a Surfcom profilometer, commercially available from the Tokyo Seimitsu Co., Ltd., Japan. The data analyzer was a SURFLYZER SURFACE TEXTURE ANALYZING SYSTEM from Tokyo Seimitsu Co., Ltd., Japan. The data analyzer graphed the profile of the surface of the abrasive article or the profile of the surface of the workpiece as the probe traversed the respective surface. The value of Ra was measured as the arithmetic average of the scratch size in micrometers. The belts were installed on a backstand grinder and used to abrade workpieces made of various metals. The contact wheel on the backstand grinder was a smooth rubber wheel having a hardness of 60 Shore A. The workpieces were held against the abrasive belt tangent to the contact wheel. Pressure was applied by hand. The traverse speed of the profilometer probe was 0.3 millimeters per second and the traverse length was 5 millimeters.

The test results are set forth in Table 1 and 2. In Table 1, the workpiece was 6061 aluminum metal. In Table 2, the workpiece was 304 stainless steel. It is evident from the figures that a random surface profile existed. The vertical magnification of the original trace for FIGS. 2, 12, 15, and 21 was 2,000 times and for FIGS. 3–11, 13, 14, and 16–20 was 500 times.

TABLE 1

| FIG. no. | Profilometer trace | Ra (micrometers) |
|---|---|---|
| 2 | surface of aluminum metal (not abraded) | 0.769 |
| 3 | Comparative Example A (new abrasive) | 8.014 |
| 4 | Comparative Example A (used abrasive) | 8.705 |
| 5 | surface of aluminum metal (abraded by abrasive of Comparative Example A) | 0.935 |
| 6 | Comparative Example B (new abrasive) | 16.741 |
| 7 | Comparative Example B (used abrasive) | 15.183 |
| 8 | surface of aluminum metal (abraded by abrasive of Comparative Example B) | 1.756 |
| 9 | Example 2 (new abrasive) | 27.167 |
| 10 | Example 2 (used abrasive) | 18.394 |
| 11 | surface of the aluminum metal (abraded by abrasive of Example 2) | 14.366 |
| 19 | Comparative Example C (new abrasive) | 7.289 |
| 20 | Comparative Example C (used abrasive) | 6.368 |
| 21 | surface of aluminum metal (abraded by abrasive of Comparative Example C) | not measured |

TABLE 2

| FIG. no. | Profilometer trace | Ra (micrometers) |
|---|---|---|
| 12 | stainless steel workpiece (not abraded) | 2.752 |
| 13 | Comparative Example A (new abrasive) | 8.559 |
| 14 | Comparative Example A (used abrasive) | 8.0065 |
| 15 | surface of stainless steel (abraded by abrasive of Comparative Example A) | 0.479 |
| 18 | Example 1 (new abrasive) | 8.028 |
| 17 | Example 1 (used abrasive) | 23.983 |
| 16 | surface of stainless steel (abraded by abrasive of Example 1) | 6.569 |

Workpieces abraded by conventional abrasive articles exhibited decreased Ra values. Workpieces abraded by the method of this invention exhibited increased Ra values.

Figure 2:
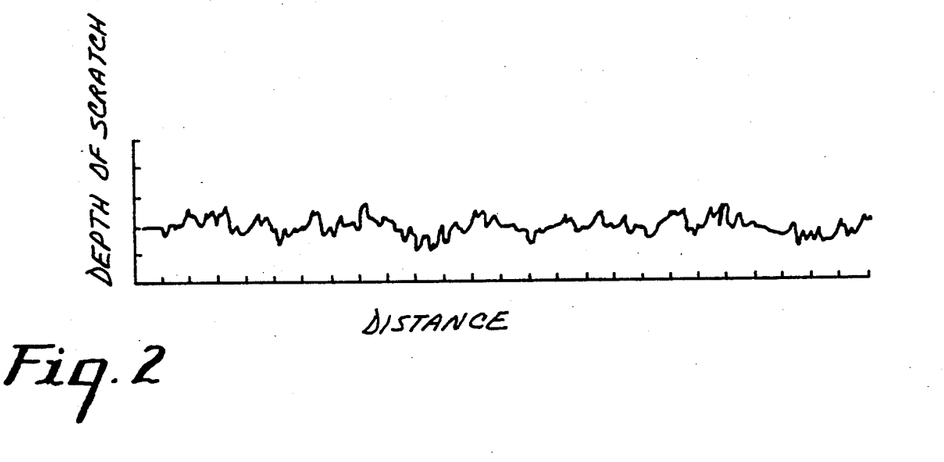
FIGS. 2 to 21 are graphs of the profilometer traces of a workpiece surface, a new abrasive article, and a used abrasive article.
Figure 3:
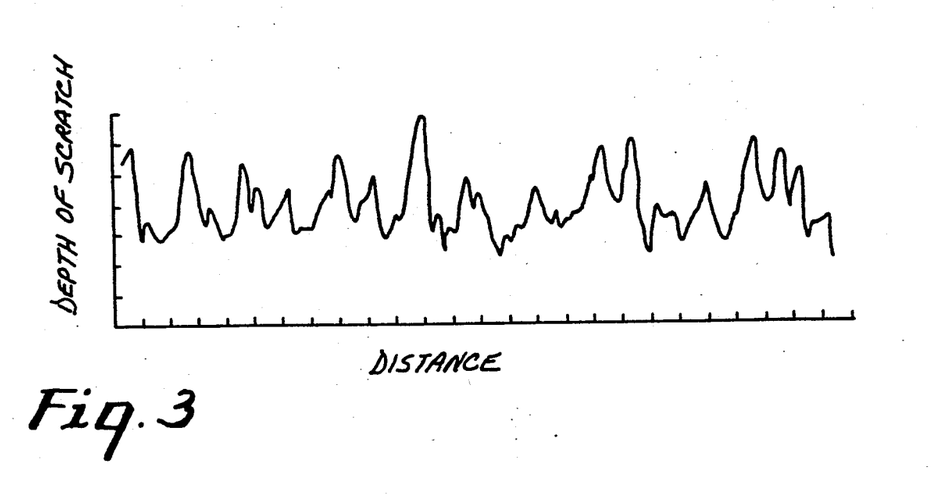
Figure 4:
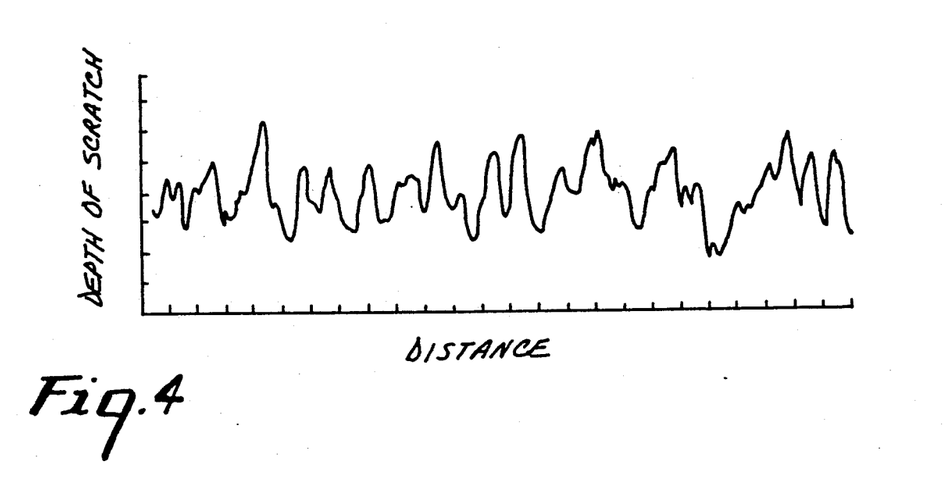
Figure 5:
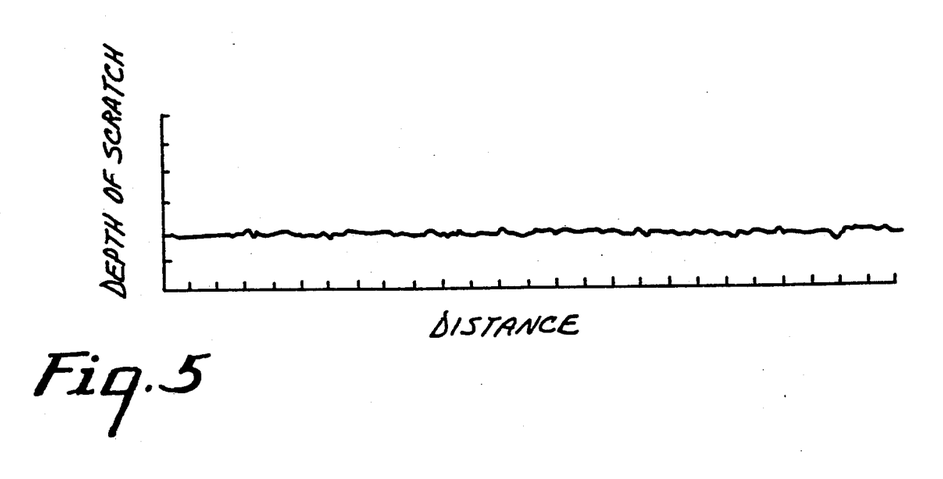
Figure 6:
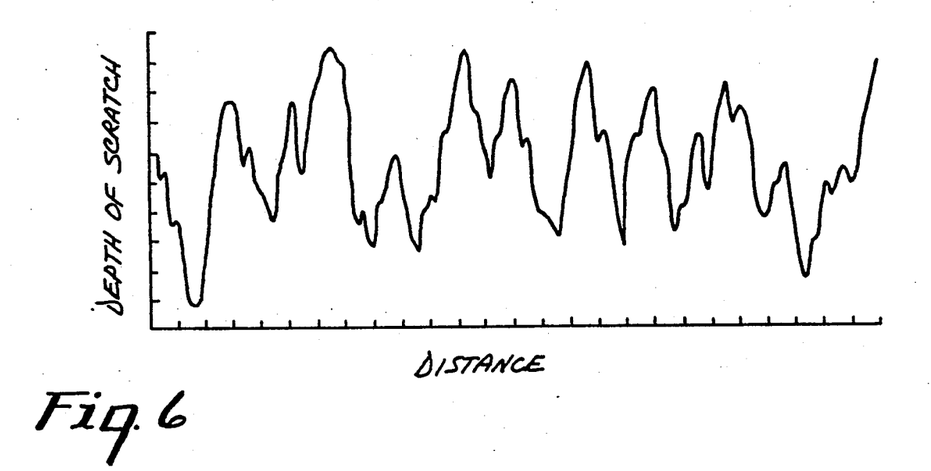
Figure 7:
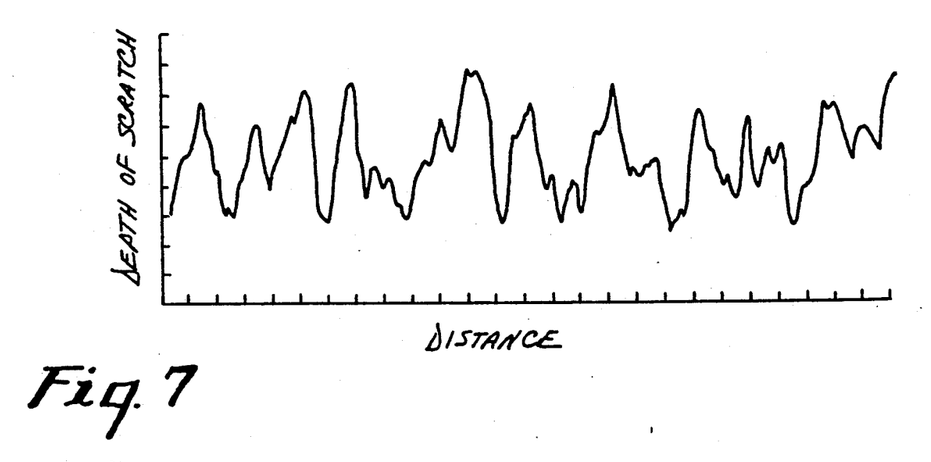
Figure 8:
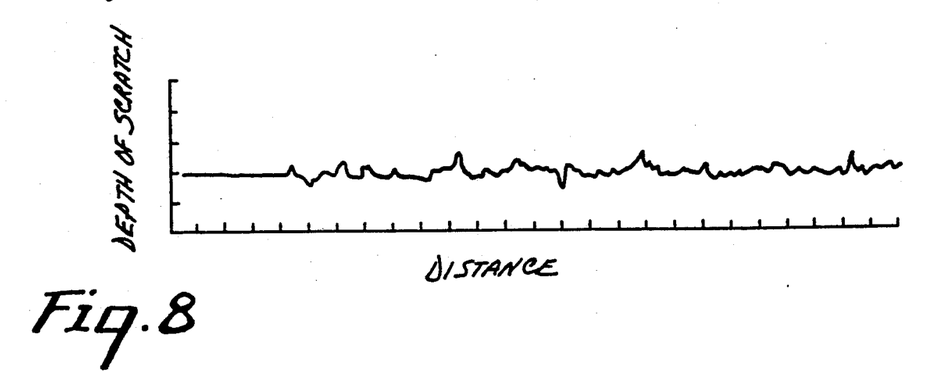
Figure 9:
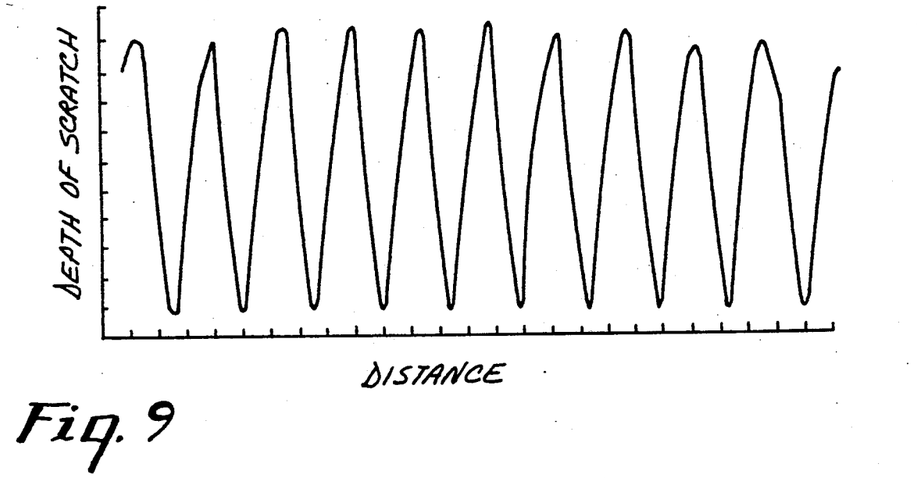
Figure 10:
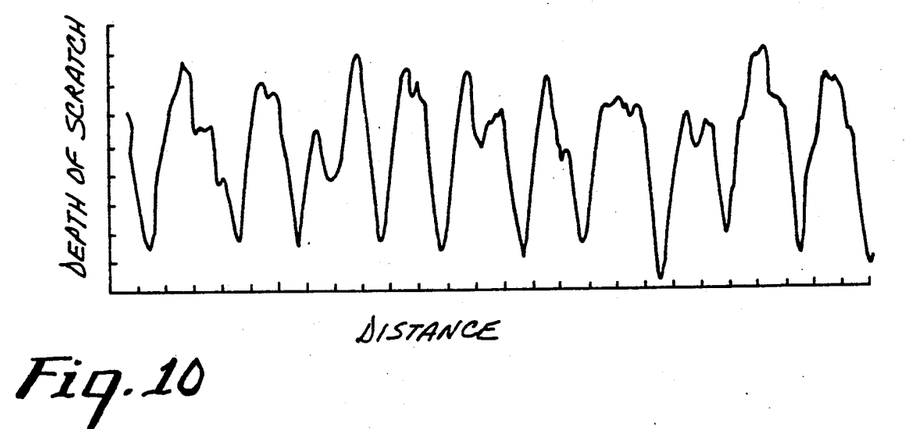
Figure 11:
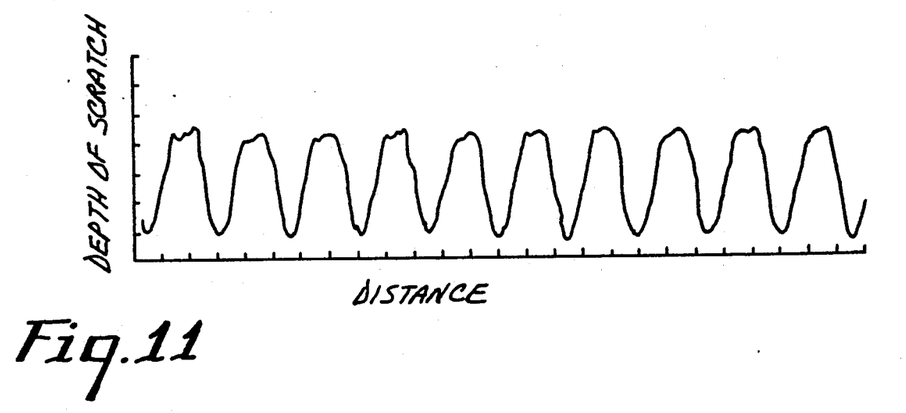
Figure 12:
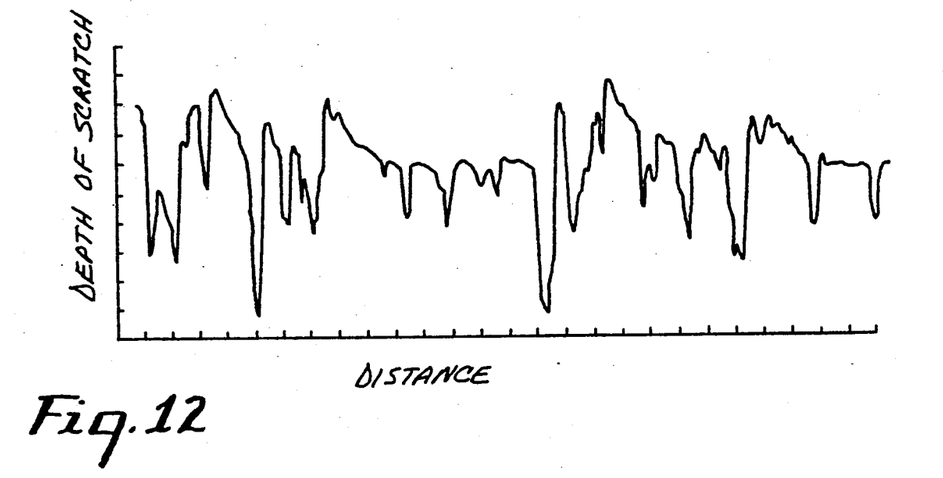
Figure 13:
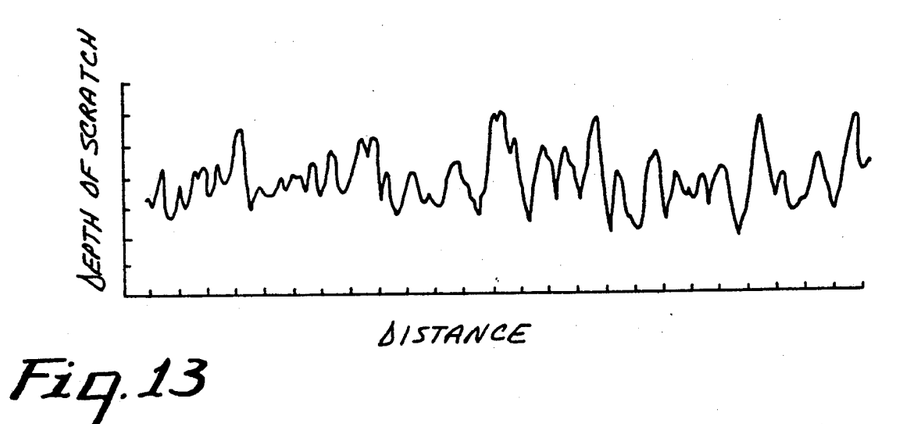
Figure 14:
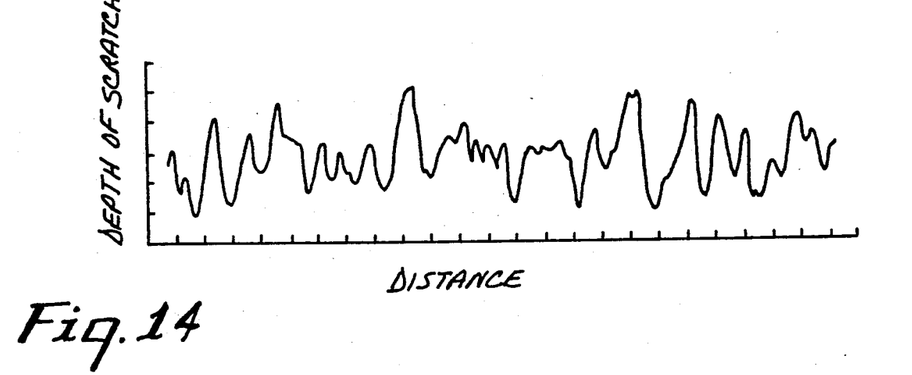
Figure 15:
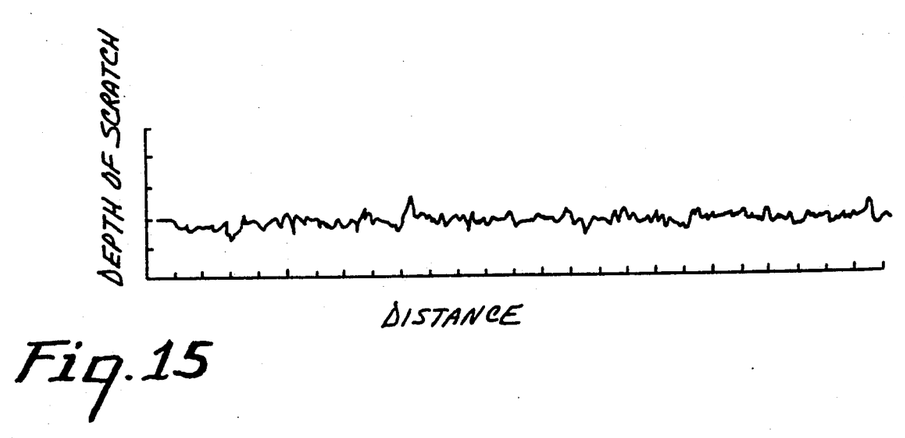
Figure 16:
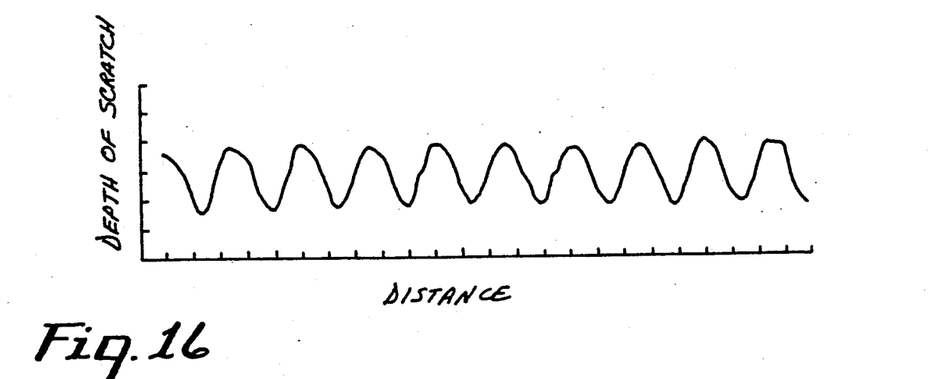
Figure 17:
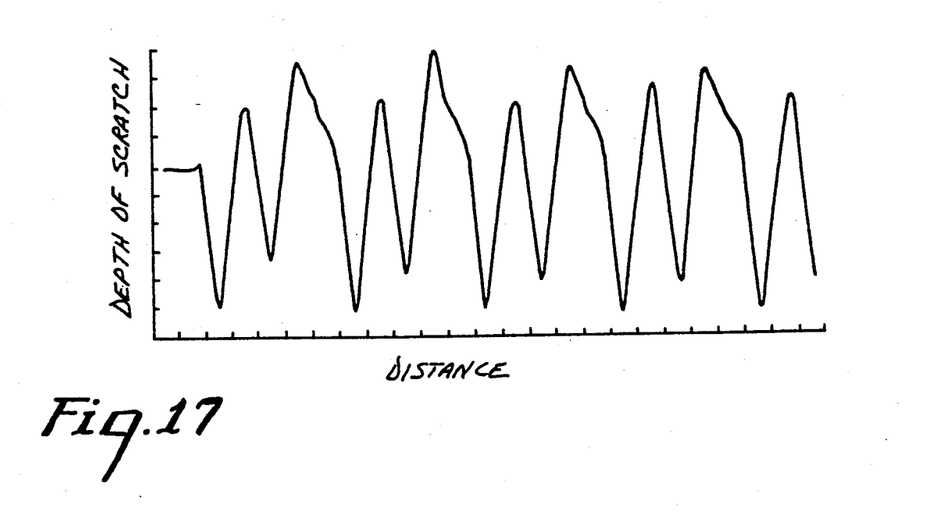
Figure 18:
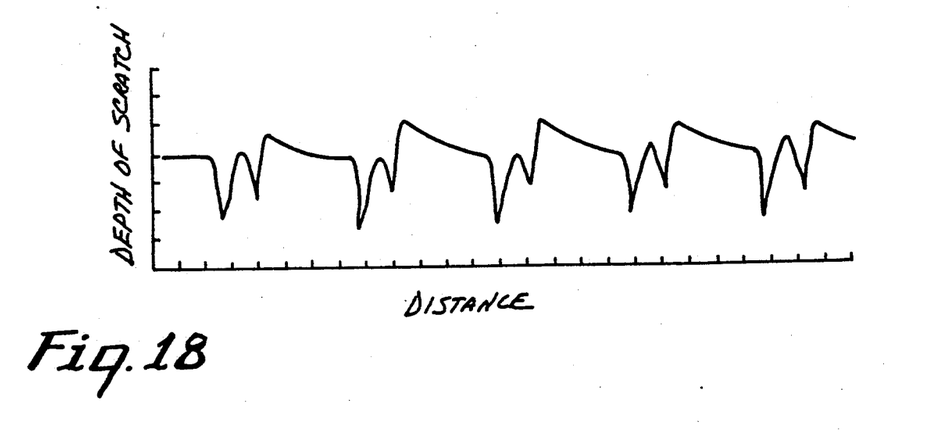
Figure 19:
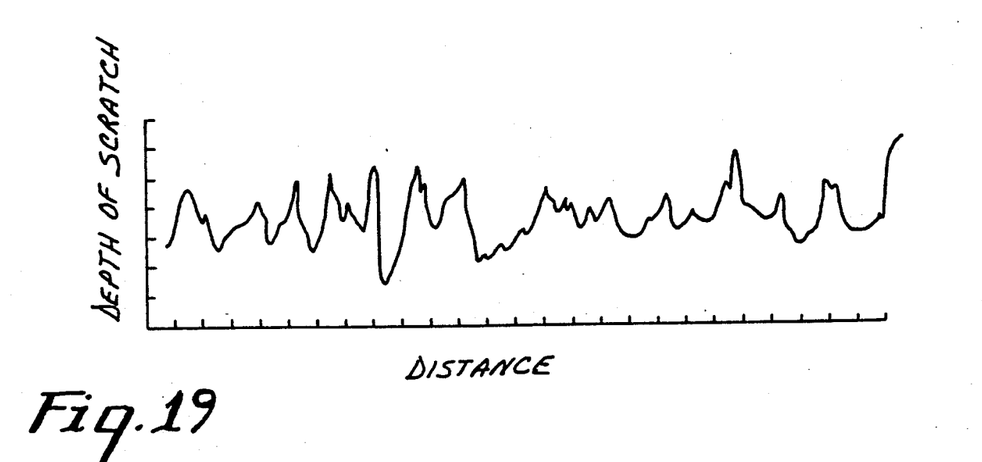
Figure 20:
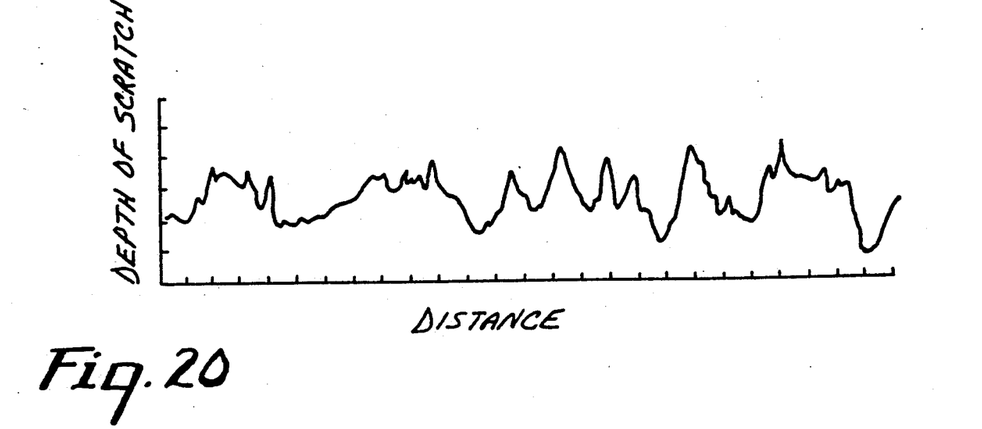
Figure 21:
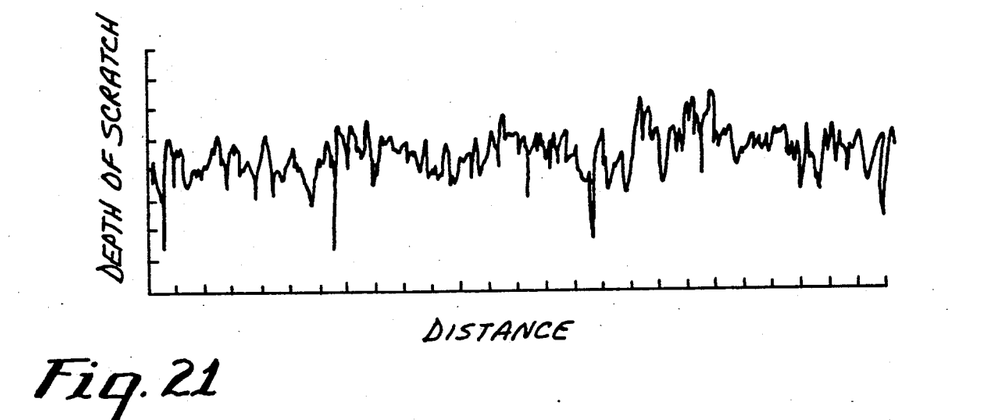

FIGS. 2 and 12 show that the pattern on the surface of the workpiece was random, i.e., there was not a recognizable or repeating pattern to the surface profile. The surface of the workpiece treated by the method of this invention had a definite pattern that was similar in nature to the surface profile of the abrasive article used (see, for examples, the set of FIGS. 9, 10, and 11 and the set of FIGS. 16, 17, and 18).

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Method of providing a pattern comprising grooves to the surface of a workpiece comprising the steps of:
   (1) providing a coated abrasive article comprising a backing bearing on at least one major surface thereof, in a non-random array, a plurality of precisely shaped abrasive composites, each composite comprising a plurality of abrasive grains dispersed in a binder,
   (2) placing the surface of said abrasive article bearing said precisely shaped abrasive composites in contact with the surface of said workpiece under sufficient pressure to provide grooves in said workpiece upon movement of said abrasive article with respect to said workpiece, and (3) moving at least one of the surface of said abrasive article or the surface of said workpiece with respect to the other surface in a direction so as to provide said pattern of grooves.

2. The method of claim 1, wherein said pattern imparted to the surface of said workpiece comprises at least one groove.

3. The method of claim 1, wherein said pattern imparted to the surface of said workpiece comprises a plurality of grooves.

4. The method of claim 1, wherein each precisely shaped abrasive composite has a boundary defined by one or more planar surfaces, said abrasive grains of said shaped abrasive composite not projecting beyond the planar surface or surfaces of said boundary.

5. The method of claim 1, wherein the RA value of the surface finish of said workpiece is increased, as characterized by a profilometer.

* * * * *